United States Patent [19]

MacKay

[11] 4,099,963
[45] Jul. 11, 1978

[54] METHOD FOR THE BATCHWISE REDUCTION OF METAL ORES

[75] Inventor: Patrick W. MacKay, Monterrey, Mexico

[73] Assignee: Fierro Esponja, S.A., Monterrey, Mexico

[21] Appl. No.: 696,488

[22] Filed: Jun. 16, 1976

Related U.S. Application Data

[63] Continuation-in-part of Ser. No. 635,655, Nov. 26, 1975, Pat. No. 4,067,728, which is a continuation of Ser. No. 516,095, Oct. 18, 1974, abandoned.

[51] Int. Cl.² ............................................ C21B 13/02
[52] U.S. Cl. ............................................ 75/35; 75/91
[58] Field of Search ..................... 75/34, 35, 26, 91

[56] References Cited

U.S. PATENT DOCUMENTS

| | | | |
|---|---|---|---|
| 3,827,879 | 8/1974 | Celada et al. | 75/35 |
| 3,904,397 | 9/1975 | Celada et al. | 75/35 |

*Primary Examiner*—M. J. Andrews
*Attorney, Agent, or Firm*—Curtis, Morris & Safford

[57] ABSTRACT

An improvement in a method for the batchwise gaseous reduction of iron ore to sponge iron in a multiple unit reactor system including a cooling reactor and at least one reduction reactor. Reduction is effected with a gas composed largely of carbon monoxide and hydrogen which may be, for example, generated by reforming a mixture of steam and natural gas or other gaseous hydrocarbons at an elevated temperature. The reducing gas requirement of the system is decreased by adding to the gas fed to one or more of the reduction reactors a minor amount of a hydrocarbon gas or vapor, e.g., natural gas, methane or a combination of methane and recycled spent reducing gas.

27 Claims, 23 Drawing Figures

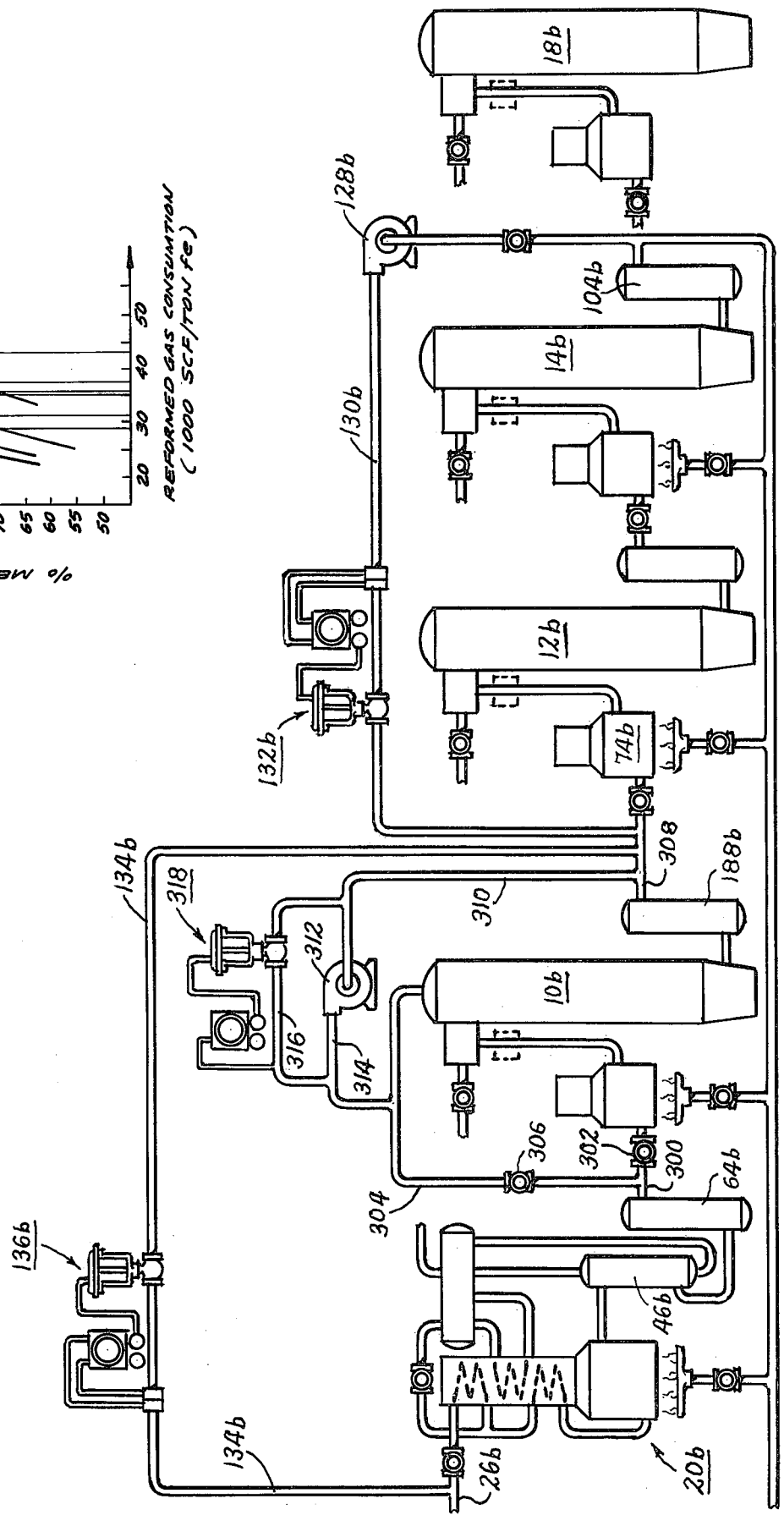

FIG. 4A
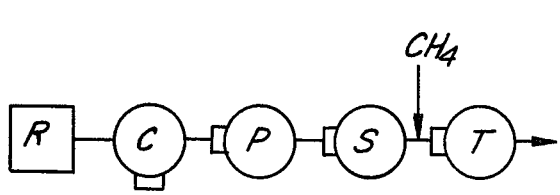
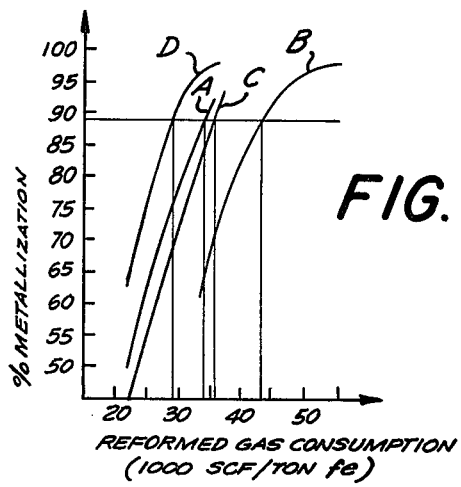
FIG. 4B
FIG. 5A
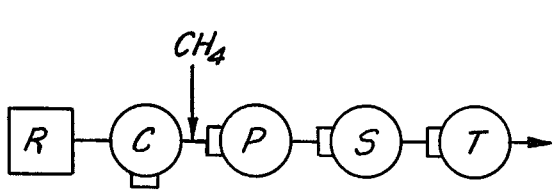
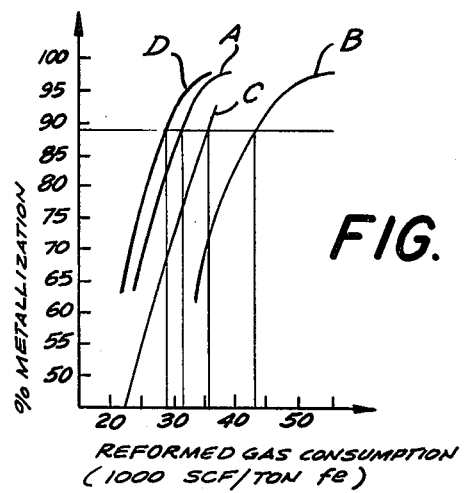
FIG. 5B
FIG. 6A
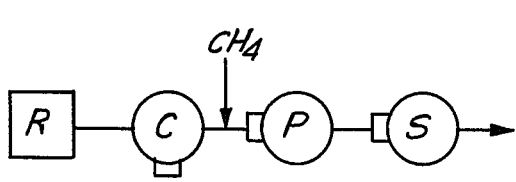
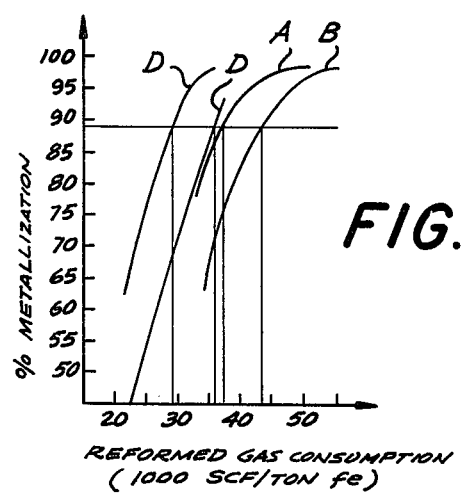
FIG. 6B

METHOD FOR THE BATCHWISE REDUCTION OF METAL ORES

This application is a continuation-in-part of application Ser. No. 635,655 filed Nov. 26, 1975 now U.S. Pat. No. 4,067,728, which is a continuation of abandoned application Ser. No. 516,095 filed Oct. 18, 1974.

This invention relates to the batchwise gaseous reduction of metal oxides at elevated temperatures and more particularly to an improved method of operating a multi-unit reactor system for effecting such a reduction process. The invention is especially useful in connection with the direct gaseous reduction of iron oxide in lump or pellet form to sponge iron and will be illustratively described in connection with this use, although as the description proceeds it will become apparent that the invention can be equally well used in processes wherein metal oxide ores other than iron oxides are reduced.

In one of its aspects the present invention is an improvement in a known type of batch process for producing sponge iron which employs a reduction system comprising a plurality of interchangeable reactors in which separate bodies of ferrous material are treated simultaneously. A process of this type is disclosed in Celada U.S. Pat. No. 2,900,247; Celada et al. U.S. Pat. No. 3,423,201; and Mader et al. U.S. Pat. Nos. 3,136,623; 3,136,624; and 3,136,625. Similar processes are also disclosed in U.S. Pat. Nos. 3,128,174; 3,684,486; 3,827,879; 3,890,142; and 3,904,397. The principal operations carried out in a reactor system of this type are (1) reduction of the ore to sponge iron, (2) cooling of the reduced ore, and (3) discharging of the sponge iron from a reactor and recharging it with fresh iron ore to be reduced. Reduction is effected by a reducing gas which is commonly a mixture largely composed of carbon monoxide and hydrogen. The gas is typically generated by the catalytic conversion of a mixture of steam and methane, usually in the form of natural gas, into carbon monoxide and hydrogen in a catalytic reformer of known type according to the equation:

$$CH_4 + H_2O \rightarrow CO + 3H_2$$

The effluent gas from the reformer is cooled and passes successively through a cooling reactor and one or more reduction reactors in series. During the cooling and reduction stages an additional reactor, sometimes called the charging or "turn around" reactor and containing previously cooled reduced ore in the form of sponge, is isolated from the system so that the sponge iron can be discharged from the reactor and the reactor charged with fresh ore. The reactor system is provided with suitable switching valves whereby at the end of each cycle the gas flow can be shifted to cause the cooling stage reactor to become the charging reactor, the last reduction stage reactor to become the cooling reactor, the charging reactor to become the first reduction stage reactor, and in cases where multi-stage reduction is used, to cause the first reduction stage reactor to become the second reduction stage reactor, the second reduction stage reactor to become the third reduction stage reactor, etc.

In the reduction reactor series of a system of this type the fresh reducing gas initially passes through the bed of iron-bearing material having the highest degree of reduction and then through beds having successively lower degrees of reduction. Because of this relationship the numbering of the reactors can give rise to confusion, since they can be numbered either in accordance with gas flow or in accordance with the degree of ore reduction. In an effort to avoid such confusion, the reduction reactors will be numbered herein in accordance with gas flow. Thus the fresh reducing gas flows to the first or primary reduction reactor in which the last stage of ore reduction is carried out, and in a system having three reduction reactors, the first stage of ore reduction is carried out in the third or tertiary reduction reactor.

In a reduction system of the type here being described the reducing gas fed to each reduction reactor is commonly heated in an indirect heater to a temperature of say 700° to 800° C., after which it flows to a combustion chamber associated with the reduction reactor wherein it is mixed with air or oxygen and a portion of reducing gas is burned to further increase its temperature to say 900° to 1100° C. before introduction into the reduction reactor. The effluent gas from each reduction reactor is cooled to remove water therefrom and then reheated before being introduced into the next successive reduction reactor.

In a gaseous reduction system of this general type the cost of the gas generating apparatus usually represents a substantial part of the total cost of the system. Hence from the standpoint of minimizing the investment required to produce a given tonnage of sponge iron of a given degree of reduction in a unit period of time, process modifications which decrease the amount of reducing gas required to produce a given tonnage of sponge iron are especially important since they make possible the use of a smaller, lower capacity catalytic reformer or other type of gas generator.

Most of the currently operating commercial systems comprise four reactors, i.e., one cooling reactor, two reduction reactors and one "turn-around" or discharging and charging reactor. It is evident that the reducing gas economy of such a system can theoretically be increased by increasing the number of reduction reactors. Thus if the number of reduction reactors is increased from two to three and the same flow of fresh reducing gas is used, it should be theoretically possible to achieve the same degree of reduction in two-thirds the amount of time. However, it has been found in practice that the use of a third series-connected reduction reactor fails to provide a full 50% increase in the productivity of the system and also gives rise to a number of practical problems. More particularly, it has been found that the sponge iron tends to "hang up" in the discharge reactor when a three-stage reduction is used and thus makes discharge of the reduced metal difficult. Also the reduction efficiency is relatively low in the third reactor, probably due to channelling therein. Moreover, it appears that the channelling and hang-up phenomena are interrelated. These practical disadvantages more than offset the theoretical advantage of using a third reduction reactor.

It is accordingly a general object of the present invention to provide an improvement in the batch process heretofore used to effect gaseous reduction of iron ore to sponge iron in a multi-reactor system of the type referred to above, which improvement decreases the amount of freshly reformed reducing gas required to effect such a reduction. It is another object of the invention to effect such a decrease in the reformed gas requirement of the system without increasing the operating cost of the system. It is still another object of the invention to provide a modification of the prior process which permits the use of three serially connected reduction reactors while avoiding the problems of channelling and "hang up" that have heretofore characterized three reduction reactor systems. Other objects of the invention will be in part obvious and in part pointed out hereafter.

In general, the present invention is based on the finding that a significant decrease in the reformed gas requirement of an ore reduction system of the type described can be effected by mixing with the reducing gas fed to at least one reduction reactor of the reduction reactor series a minor amount of a fluid hydrocarbon, e.g., a gaseous hydrocarbon such as methane or a mixed gas containing a substantial amount of methane or other gaseous hydrocarbon such as natural gas or coke oven gas. As will be pointed out more fully hereafter, by mixing with the reducing gas fed to at least one of the reduction reactors, prior to heating the feed reducing gas, a relatively small amount of a fluid hydrocarbon, usually a gaseous hydrocarbon, the productivity of the system in terms of iron of a given degree of metallization per unit quantity of reducing gas per unit time can be substantially increased. It has been still further found that in cases where a third reduction reactor is used, the addition of methane to the reducing gas fed to the reduction reactors eliminates the channelling and hang-up problems previously noted in such 3-reactor systems.

As conducive to a clearer understanding of the present invention, it may be pointed out that it is known that methane is a relatively ineffective reducing agent for reducing iron ore. It is for this reason that the relatively expensive catalytic conversion processes are used for converting methane into carbon monoxide and hydrogen to provide an efficient gaseous reducing mixture. It is evident that on the basis of this prior knowledge the addition of methane to the feed gas to the reduction reactors is contra-indicated.

It has been found, however, that there are a number of points in the process where methane that may be present in the reducing gas is converted into carbon monoxide and hydrogen, and that if a limited amount of methane is added to the feed gas to the reduction reactors, the methane will be converted into more efficient reducing constituents as the gas passes through the series of reduction reactors. More particularly, it has been found that in the combustion chambers that are associated with the reactors and in which the reducing gas is partially burned by admixture with oxygen or air, methane present in the entering reducing gas is preferentially converted to more efficient reducing constituents such as carbon monoxide and hydrogen. Also the metal-bearing material in the first reduction reactor is largely reduced to sponge iron, and at the temperature prevailing in this reactor, this sponge iron acts as a catalyst to promote the conversion of the methane content of the reducing gas to more efficient reducing constituents. Thus by adding a minor amount of methane or other hydrocarbon gas to the reformed gas fed to the reduction reactor series, the amount of reformed gas that must be supplied by the catalytic reformer is decreased. Also it has been found that the requirement for reformed gas can be still further decreased by adding to the gas fed to the reduction reactors, in addition to the added methane, a minor amount of the effluent gas from the same or a subsequent reactor of the reduction reactor series.

The methane and recycled spent gas should be added to the reformed gas only in minor amount, since if major amounts of methane and recycled gas are added at this point in the system, excessive carbon deposition occurs and/or the desired reduction in reformed gas requirement per ton of sponge iron of a given degree of metallization is not achieved. In most cases the aggregate amount of methane added to the reduction reactors desirably falls within the range 2% to 12% by volume of the fresh reformed gas, with 5% to 10% by volume being preferred. In respect to the recycled spent gas, the quantity to be incorporated in the reduction reactor feed gas will in most cases desirably fall within the range 3% to 30% by volume of the reformed gas, with 5% to 20% by volume being preferred. However, as more fully discussed below, in the special case where a single reduction reactor is used, the recycled gas may desirably be increased to 50% or more of the gas feed to the reactor.

The objects and advantages of the present invention can best be understood and appreciated by reference to the accompanying drawings which illustrate apparatus capable of being used to carry out the process of the invention and wherein:

FIG. 2 is a diagrammatic illustration of a multiple reactor system comprising an "in-line" cooling reactor and two reduction reactors connected in series and adapted to be used in carrying out another advantageous embodiment of the invention;

Figure 1:
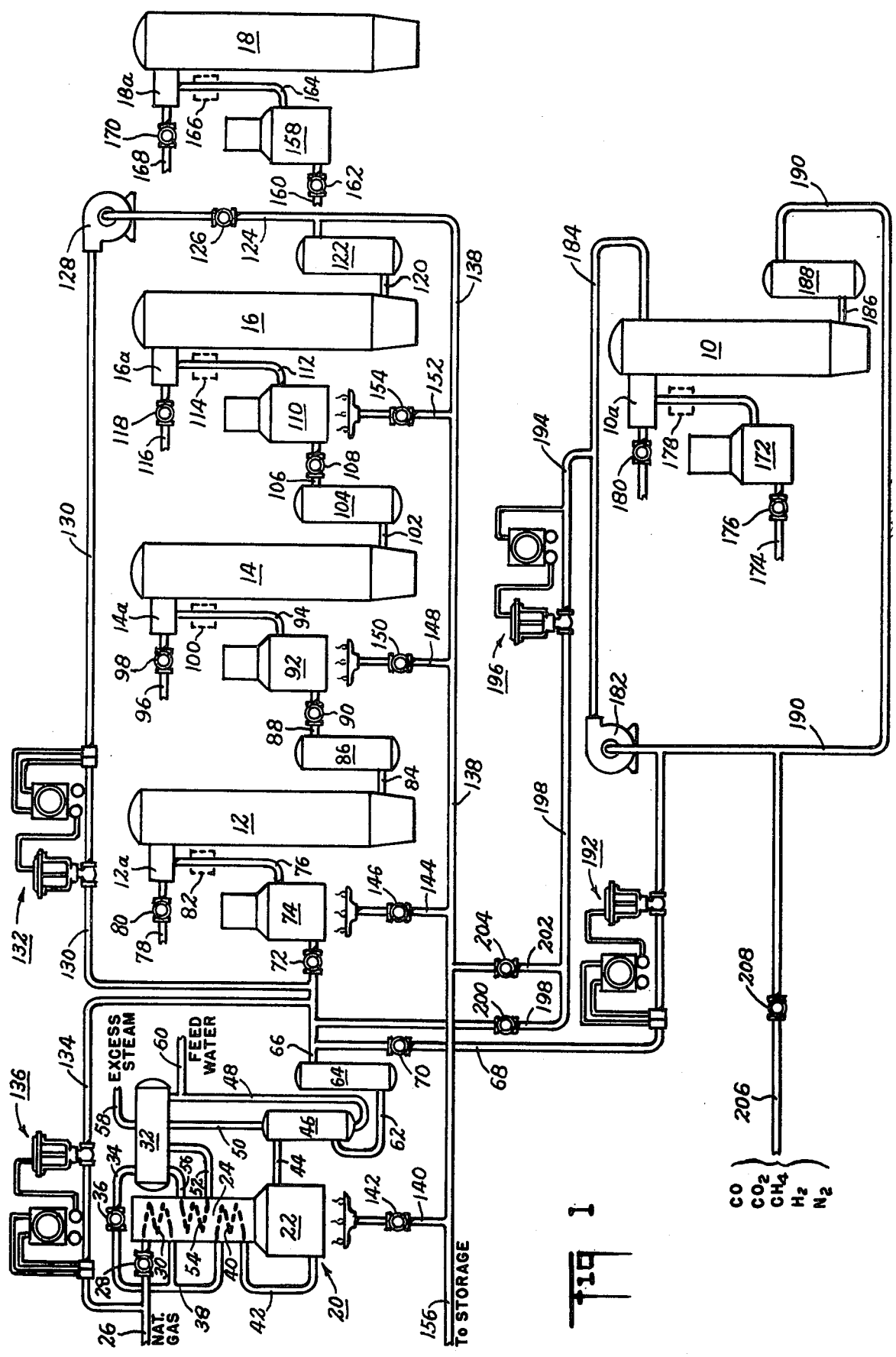
FIG. 1 illustrates diagrammatically a multiple reactor system comprising an "out-of-line" cooling reactor and three reduction reactors connected in series and adapted to be used in carrying out a preferred embodiment of the invention.

FIG. 3 is a graph illustrating the manner in which the addition of methane to the first reduction reactor feed gas and the combination of methane addition and recycled gas addition to the first reduction reactor feed gas in accordance with the present invention can be expected, on the basis of computer simulation and pilot plant tests, to decrease the demand for reformed reducing gas in the systems of FIGS. 1 and 2;

FIGS. 4A, 5A, 6A, 7A, 8A, 9A, 10A, 11A, 12A and 13A are simplified diagrammatic representations of additional modifications of the invention illustrating various points in the reduction system at which methane can be advantageously introduced and spent gas advantageously recycled. In these figures "R" represents the reformer, "C" the cooling reactor, "P" the primary reduction reactor, "S" the secondary reduction reactor and "T" the tertiary reduction reactor; and FIGS. 4B through 13B correspond, respectively, to the "A" Figures and are graphs illustrating the improved productivity that can be expected, on the basis of computer simulation and pilot plant tests, when using the flow arrangement illustrated in the corresponding "A" Figures.

Referring to the drawings and more particularly to FIG. 1, the system there shown generally comprises the cooling reactor 10, the primary reduction reactor 12, secondary reduction reactor 14, tertiary reduction reactor 16 and the charging reactor 18. As indicated above, the ore reduction system shown is operated in a cyclic or periodic manner. The ore reduction and cooling operations, as well as the discharging of cooled sponge iron from the charging reactor and the recharging thereof with fresh ore, are carried out simultaneously over a predetermined period of time which may vary depending upon such factors as reducing gas quality and flow rate, reactor size, gas recirculation rates and the like. At the end of each cycle of operations, the reactors are functionally interchanged in such manner that the charging reactor becomes the tertiary reduction reactor, the tertiary reduction reactor becomes the secondary reduction reactor, the secondary reduction reactor becomes the primary reduction reactor, the primary reduction reactor becomes the cooling reactor and the cooling reactor becomes the charging reactor. This functional interchange of the reactors can be effected by an arrangement of valves and piping between the reactors that is known in the art per se and has been omitted from the drawing in order to simplify the showing therein.

The flow of reducing gas through the reduction reactors is generally counter-current. That is to say, the fresh reducing gas is fed to the primary reduction reactor which contains iron-bearing material that has already been partially reduced in the secondary reduction reactor and tertiary reduction reactor in previous cycles. The tertiary reduction reactor, which initially contains fresh ore, is treated with gas that has already passed through the primary and secondary reduction reactors.

Referring now to the left-hand side of FIG. 1, a reducing gas composed largely of carbon monoxide and hydrogen is generated in a reformer 20 of known construction comprising a gas-heated catalytic converter section 22 and stack 24. Methane, natural gas or other hydrocarbon gas or vapor from a suitable source is supplied through a pipe 26 containing a valve 28 and is preheated by passing it through a coil 30 near the top of stack 24 and in heat exchange relation with the hot gases flowing through the stack. Hydrocarbon gas, e.g., methane, leaving the coil 30 is mixed with steam in the proper proportions for catalytic conversion into carbon monoxide and hydrogen, typically in a carbon/steam molar ratio of 1:2 to 1:3. More particularly, steam is supplied from a steam drum 32 through a pipe 34 containing a valve 36, and the mixture of steam and methane flows through pipe 38 to a coil 40 in the lower portion of stack 24 wherein it is further preheated. From coil 40 the methane-steam mixture flows through pipe 42 to the converter section 22 of reformer 20, wherein it passes through externally heated catalyst tubes in known manner to effect the desired conversion to carbon monoxide and hydrogen.

From reformer 20 the hot reducing gas flows through pipe 44 to a tubular waste heat boil 46 wherein its sensible heat is used to generate steam. More particularly, hot water from steam drum 32 flows downwardly through pipe 48 to the bottom of boiler 46 and thence through the tubes thereof, wherein a portion of the water is converted to steam by the heat of the hot reducing gas. The resulting mixture of steam and hot water returns to drum 32 through pipe 50.

In order to utilize further the heat in the hot gases passing through stack 24 of reformer 20, hot water is withdrawn from the bottom of drum 32 through pipe 52, then flows through a coil 54 within stack 24, and is returned to drum 32 through pipe 56. The heat recovered in boiler 46 and the coils in stack 24 is more than enough to generate the steam required for admixture with methane as feed to the reformer. Hence excess steam is available which can be withdrawn from drum 32 through pipe 58 and used for general plant purposes. Make-up feed water for the steam generating system just described is supplied through pipe 60. The use of the steam drum 32, waste heat boiler 46 and coils 30, 40 and 54 within stack 24 substantially improves the overall thermal economy of the system.

The reducing gas, which has been cooled by passage through boiler 46, flows through pipe 62 to a quench cooler 64 wherein it is cooled and de-watered, and then to the reducing gas heater 66. Some of the reducing gas from header 66 may be withdrawn through the pipe 68 containing the valve 70 and supplied to the cooling reactor system as described hereafter. The main portion of reducing gas flows through pipe 66 which is provided with a valve 72 to a coil heater 74 wherein it is heated to a temperature of the order of 700° to 850° C. Since the desired reducing gas temperature at the entrance to the primary reduction reactor 12 is of the order of 900° to 1100° C., preferably about 1050° C., further heating of the gas leaving coil heater 74 is required, and this further heating is effected in a combustion chamber 12a which communicates with the top of primary reduction reactor 12. More particularly, the effluent gas from heater 74 flows through a pipe 76 to the combustion chamber 12a wherein it is mixed with an oxygen-containing gas supplied through pipe 78 containing valve 80. The oxygen-containing gas may be air or pure oxygen or mixtures thereof. Within the combustion chamber a portion of the hot reducing gas is burned to provide a mixture having the desired relatively high temperature. The combustion chamber 12a may be of the type disclosed in Celada U.S. Pat. No. 2,900,247. If desired, the effluent gas from heater 74 may be further heated in a superheater 82 located in pipe 76. The use of a superheater is advantageous in the present process wherein a hydrocarbon gas such as methane is added to the reducing gas between the reformer and the primary reduction reactor as described below, since by using a superheater the amount of oxygen-containing gas supplied to the combustion chamber 12a can be advantageously reduced in some cases.

The volume of oxygen-containing gas used, as well as its temperature, depends upon the oxygen content of the gas. Thus if air is used as the oxygen-containing gas, it is desirably preheated to a temperature of the order of 700° C. or higher, whereas if oxygen is used, it need not be preheated or may be preheated to a substantially lower temperature. If air is used as the oxygen-containing gas, the volumetric ratio of air to reducing gas with which it is mixed may be as high as 0.4:1 and is typically in the range 0.10:1 to 0.3:1. If, on the other hand, oxygen is used as the oxygen-containing gas, a volumetric ratio with the range 0.02:1 to 0.15:1 will usually give acceptable results.

From the combustion chamber 12a the hot reducing gas enters the top of primary reduction reactor 12 and flows down through the bed of iron-bearing material therein to effect a further reduction of the iron-bearing material to sponge metal. The effluent gas from reactor 12 leaves the reactor near the bottom thereof through a pipe 84 and passes through a quench cooler 86 wherein it is cooled and de-watered and then through a pipe 88 containing a valve 90 to a coil heater 92, similar to the heater 74. Within the heater 92 the gas is again heated to a temperature of the order of 700° to 850° C. and then flows through pipe 94 to the cmbustion chamber 14a of secondary reduction reactor 14 which is similar to the combustion chamber 12a. Chamber 14a receives a supply of oxygen-containing gas through a pipe 96 containing valve 98. Within combustion chamber 14a a portion of the reducing gas is burned to increase the temperature thereof to the order of 900° to 1100° C. and the resulting heated gas enters secondary reduction reactor 14 and flows downwardly through the bed of iron-bearing material therein to effect a partial reduction thereof. As in the case of the primary reactor system, the secondary reactor system may be provided with a superheater 100 located in pipe 94.

The effluent gas from secondary reduction reactor 14 flows through a pipe 102, quench cooler 104 and pipe 106 containing a valve 108 to a coil heater 110 which is similar to the heaters 74 and 92 and similarly heats the gas passing therethrough. From heater 110 the gas flows through pipe 112, which may be provided with superheater 114 to combustion chamber 16a which communicates with the top of tertiary reduction reactor 16. The combustion chamber 16a is similar to and operates similarly to the combustion chambers 12a and 14a. Chamber 16a is supplied with an oxygen-containing gas through pipe 116 containing valve 118. Hot reducing gas from chamber 16a flows downwardly through the bed of iron-bearing material in tertiary reactor 16 effecting a partial reduction thereof. Effluent gas from the tertiary reactor flows through a pipe 120 to a quench cooler 122 wherein it is cooled and dewatered.

As indicated above, in accordance with the present invention a minor amount of a hydrocarbon gas such as methane is mixed with the reformed reducing gas fed to the first reduction reactor. Such methane can be introduced into the header 66 through a pipe 134 which is connected to the supply pipe 26. Pipe 134 contains a flow controller 136 which may be adjusted to provide a predetermined regulated flow of methane to the header 66. The amount of added methane is preferably from about 2% to 12% by volume of the reformed gas fed to reactor 12. As will be pointed out below in connection with the discussion of FIG. 3, the addition of methane through pipe 134 to the reformed reducing gas in pipe 66 substantially reduces the reformed reducing gas requirement of the system.

It has also been found that the requirement for reformed reducing gas can be still further reduced by recycling a certain amount of effluent gas from one of the reduction reactors to the feed gas entering a reduction reactor as illustrated in FIG. 1. More particularly, a predetermined regulated fraction of the effluent gas from cooler 122 is caused to flow through pipe 124 containing valve 126 to a pump 128 and thence through pipe 130 containing flow controller 132 to the reducing gas header 66. As indicated above, the quantity of recycled effluent gas is a minor amount by volume of the reformed gas fed to reactor 12, usually from 3% to 30% of the volume of reformed gas.

Reverting now to the right-hand portion of FIG. 1, the remainder of the effluent gas from tertiary reduction reactor 16 flows to and through a header 138. As indicated in the drawing, at least a portion of this effluent gas may be used as a fuel gas to heat the lower section 22 of reformer 20 and the heaters 74, 92 and 110. More particularly, gas from header 138 can be withdrawn through pipe 140 containing valve 142 to supply fuel for heating the lower section 22 of reformer 20; through pipe 144 containing the valve 146 to supply fuel for heating the heater 74; through pipe 148 containing valve 150 to supply fuel for heating the heater 92; and through pipe 152 containing the valve 154 to supply fuel for heating the heater 110. If the amount of effluent gas from the tertiary reduction reactor is more than that required for recycling through pipe 130 and for heating the reformer and reduction reactor heaters, the excess gas can be removed through pipe 156 to a suitable point of storage or vented to the atmosphere.

Referring now to the right-hand side of the drawing, there is illustrated a charging reactor which is structurally similar to the reduction ractors 12, 14 and 16 and is similarly provided with a heater 158 having an inlet pipe 160 provided with a valve 162. Effluent gas from heater 158 flows through a pipe 164, which may contain a superheater 166, to a combustion chamber 18a. Oxygen-containing gas can be supplied to combustion chamber 18a through a pipe 168 containing a valve 170. However, during the portion of the cycle here being described, the valves 162 and 170 are closed and the charging reactor 18 is isolated from the system so that cooled reduced sponge iron can be discharged from the reactor and a charge of fresh ore introduced therein.

As indicated above, the system of FIG. 1 is characterized by the fact that an out-of-line cooling reactor is used. The cooling reactor 10, like reactors 12, 14 and 16, is provided with a heater 172, inlet pipe 174 containing a valve 176, superheater 178 and combustion chamber 10a which, during the part of the cycle here being described, are rendered inoperative by closure of valves 176 and 180. As described above, the reactor 10 at the beginning of a reduction cycle contains hot reduced sponge iron from a previous reduction cycle. This bed of hot sponge iron particles is cooled by circulation of a cooling gas therethrough. The cooling gas recirculation system comprises a pump 182 which pumps gas through a pipe 184 to the top of cooling reactor 10. The gas flows downwardly through the body of reduced metal in the reactor and cools it. The effluent gas from the cooling reactor 10 flows through a pipe 186 to a quench cooler 188 wherein it is cooled and dewatered and is then returned through pipe 190 to the suction of pump 182. If it is desired to use a reducing gas as a cooling medium for cooling the reduced ore, gas may be withdrawn from header 66 through pipe 68 containing shut-off valve 70 and flow controller 192 to introduce a predetermined flow of reducing gas into the cooling reactor recirculation system. In order to prevent an undesired build-up of pressure within the cooling system, gas is removed from pipe 184 through a pipe 194 containing a back pressure regulator 196 for maintaining a desired pressure in the cooling system. The cooling gas removed through pipe 194 may flow either through pipe 198 containing valve 200 back to the header 66 or through pipe 202 containing valve 204 to the spent gas header 138 or both.

In general, the use of the out-of-line cooling reactor increases the operating flexibility of the system since it permits independent control of both the gas flow rate and gas composition in the cooling gas loop.

As indicated above, it is often desirable to use as a cooling gas for cooling the hot ore a gas containing constituents capable of depositing a predetermined amount of carbon on the surface of the reduced sponge iron. Thus it may be desirable tp use in the cooling cycle a gas having a somewhat different composition than that fed to the reduction reactors in order to achieve an optimum deposition of carbon on the sponge iron. To permit modification of the gas composition within the cooling reactor recirculating system, a branch pipe 206 containing a valve 208 is connected to the cooling gas recirculation pipe 190. As indicated in the drawing, any of various gases, e.g., carbon monoxide, methane, hydrogen, nitrogen or carbon dioxide may be introduced into the cooling gas loop through pipe 206, either in place of or in addition to the reformer product gas supplied to pipe 68. Thus with the system shown the composition of the cooling gas can be readily modified to effect a desired deposition of carbon on the surface of the reduced sponge iron particles. Also the rate of flow of the cooling gas can be varied over a relatively wide range independently of the rate of flow of reducing gas through the reduction reactors of the system.

Referring now to FIG. 2 of the drawings, the system there shown is generally similar to the system of FIG. 1 but differs therefrom in that the cooling ractor is "in-line" and the system comprises two reduction reactors, rather than three such reactors. In describing the system of FIG. 2, the same reference characters will be used for parts corresponding to those of FIG. 1 with the identifying letter "b" added to indicate that the part is incorporated in the system of FIG. 2.

In general, the system of FIG. 2 comprises the cooling reactor 10b, reduction reactors 12b and 14b and the charging reactor 18b. Natural gas enters the system through pipe 26b and flows to reformer 20b wherein it is first mixed with steam and then passed over a catalyst bed to form a reformed reducing gas consisting largely of carbon monoxide and hydrogen. The reformed gas flows through waste heat boiler 46b, cooler 64b and a pipe 300 containing valve 302.

During the portion of the cycle here being described the valve 302 is closed and all of the reformed gas flows through pipe 304 containing valve 306 to the top of the cooling reactor 10b and thence downwardly through the bed of reduced ore therein. The cooling reactor 10b initially contains hot reduced ore from a previous reducing operation having a degree of metallization of the order of 65% to 90%. The reducing gas flowing downwardly through the bed of metal-bearing material in cooling reactor 10b desirably performs three functions, namely, cooling of the sponge iron of the bed, deposition of carbon on the sponge iron surfaces due to cracking of carbon-containing components of the reducing gas and further reduction unreduced ore in the bed.

In general, carbon deposition within the bed takes place for the most part during the early part of the cycle when the bed is at a relatively high temperature. In order to achieve the twin objectives of deposition of a desired amount of carbon on the sponge iron and rapid cooling of the single iron, the gas flow is desirably maintained at a relatively low value at the beginning of the cycle and increased during the latter part of the cycle after the desired carbon deposition has been completed and when a maximum cooling rate is desirable. These objectives are attained by recycling a portion of the cooling gas as described below.

Effluent gas from the bottom of cooling reactor 10b flows through a cooler 188b to a pipe 308 wherein the flow is divided. A portion of the gas flows to the heater 74b and then to the reduction reactor 12b wherein it reduces the metal-bearing material in the reactor as described in connection with reactor 12 of FIG. 1. The remainder of the effluent gas from cooler 188b flows through pipe 310 to the inlet of pump 312 and from the discharge of pump 312 through pipe 314 which is connected to pipe 304. Thus a portion of the gas is recycled by the pump 312 and combined with the freshly reformed gas to form the cooling gas fed to the top of cooling reactor 10b. Pump 312 is provided with a bypass 316 containing a pressure controller 318 which maintains a constant but adjustable pressure at the discharge side of pump 312.

In essence, cooling of the metal-bearing material in reactor 10b is carried out as disclosed in Celada et al. U.S. Pat. No. 3,423,201. During the early portion of the cooling cycle when it is desired to deposit a predetermined desired amount of carbon on the sponge iron in the bed, little, if any, gas is recycled by pump 312. During the later portion of the cycle after carbon deposition has substantially ceased, the recycle of gas by the pump 312 is started or increased to effect a rapid cooling of the metal-bearing material within the cooling reactor. During this second cooling stage the volumetric ratio of recirculated gas to fresh reformed gas flowing through pipe 304 is desirably maintained from about 0.5:1 to 4:1.

As in the case of the system of FIG. 1, there is admixed with the reformed gas flowing to the first reduction reactor minor amounts of methane and, if desired, spent gas recycled from the last reduction reactor of the system. More particularly, a small amount of the natural gas entering the system through pipe 26b flows through pipe 134b containing the flow controller 136b to pipe 308 wherein it is mixed with the reformed gas coming from cooler 188b. Also a portion of the effluent gas from cooler 104b of the second reduction reactor 14b is recycled by pump 128b through pipe 130b containing flow controller 132b to pipe 308 wherein it is mixed with the effluent gas from cooler 188b and the methane entering from pipe 134b. The mixed gas then flows to the heater 74b of the first reduction reactor 12b and is used to effect a reduction of the ore as described in connection with FIG. 1.

As pointed out above, it has been found that by adding a minor amount of methane to the reduction reactor feed gas, either with or without addition of recycled spent gas, the amount of fresh reformed gas required to produce a given degree of metallization of a given amount of ore can be substantially reduced. This effect is illustrated in FIG. 3 of the drawings wherein percent metallization obtainable with an ore reduction system of the type described is plotted against reformed gas composition in terms of thousands of standard cubic feet per ton of iron. In general, the curves of FIG. 3 (as well as the curves of FIGS. 4B to 13B) are based on computer simulation with some degree of empirical verification. The curves indicate the approximate typical performance that can be expected when using the process of the present invention in systems of the type disclosed in FIGS. 1 and 2. Curves A, B and C relate to the system of FIG. 1, and Curves D, E and F relate to the system of FIG. 2. Curve A indicates the expected relation between percent metallization and reformed gas consumption in a system such as that of FIG. 1 when no methane addition or spent gas recycle is used. Under these conditions approximately 35,000 cubic feet of reformed gas are indicated to be needed to produce a ton of iron having say 89% metallization. Curve B represents this relationship when 8% by volume methane is added to the reduction reactor feed gas. Curve C represents the same relationship when both an 8% methane addition and a 10% by volume spent gas recycle are used. The curves indicate that by using the combination of methane addition and spent gas recycle, the reformed gas requirement can be reduced from about 35,000 to about 29,000 cubic feet per ton.

It will, of course, be understood that the numerical values for gas consumption given in FIG. 3 will vary as a function of such factors as the composition and physical condition of the ore used, gas flow rates, configuration of the ore bed and the like. However, the curves indicate that for a given set of process conditions, a substantial reduction in the demand for reformed gas can be achieved by adding minor amounts of methane or a combination of methane and recycled spent gas to the reduction reactor feed fas as disclosed herein.

Still referring to FIG. 3, Curve D indicates that when the system of FIG. 2 is used without methane addition or spent gas recycle the reformed gas requirement to achieve 89% metallization in a typical case is about 43,600 cubic feet per ton. Curve E indicates that with 8% by volume of methane added to the reformed gas under the same conditions, the reformed gas requirement can be expected to drop to about 37,000 cubic feet per ton, and Curve F indicates that by using both methane addition and spent gas recycle, a decrease of the reformed gas requirement to about 35,200 cubic feet per ton can be expected. It will be noted that the economy obtained with the three reduction reactor system of FIG. 1 is substantially greater than that obtained with the two reduction reactor system of FIG. 2. As pointed out above, the addition of methane to the reduction reactor feed gas is especially important in the case of the system of FIG. 1 in order to overcome the channelling and hang-up problems that are encountered in using a third reduction reactor without added methane.

Turning now to FIGS. 4A and 4B, the system illustrated in FIG. 4A comprises a reformer, an "in-line" cooling reactor and three series-connected reduction reactors. In this case 8% by volume methane is added to the reducing gas flowing from the secondary to the tertiary reactor. The methane is added to the effluent reducing gas from the secondary reactor after the reducing gas has been cooled and de-watered and before it is reheated for use in the tertiary reduction reactor. The expected performance of this system is indicated by Curve A of FIG. 4B.

Curves B, C and D are included for reference purposes and are the same in each of FIGS. 4B through 13B. Curve B illustrates the typical performance of a system having two reduction reactors and no methane addition and thus corresponds to Curve D of FIG. 3. Curve C illustrates the typical performance of a system having three reduction reactors and no methane addition and thus corresponds to Curve A of FIG. 3. Curve D. illustrates the performance of an "ideal" three reduction reactor system with no added methane, i.e., a system in which the use of a third reduction reactor is assumed to produce a full 50% increase in reduction capacity.

It is evident from a comparison of Curve A with Curves B, C and D, and particularly with Curve C that addition of methane to the feed gas to the tertiary reactor produces some improvement in the economy of the system, although not the ideal economy of Curve D.

FIG. 5A illustrates a system with three reduction reactors and methane added to the feed gas to the primary reduction reactor. In FIG. 5B Curve A indicates the expected result using such a system with 8% by volume of methane added. A comparison of Curves A and D shows that this system provides an economy approximately the same as that illustrated by Curve D, i.e., approximately the same as the ideal performance of a three reduction reactor system without added methane.

FIG. 6A illustrates a two reduction reactor system with methane added to the feed gas to the primary reduction reactor and thus is a two reduction reactor counterpart of the system of FIG. 5A. The performance of this system with 8% by volume of methane added is illustrated by Curve A of FIG. 6B which corresponds with Curve E of FIG. 3. It is evident from FIG. 6B that the performance of the system of FIG. 6A is substantially improved by the addition of methane and very nearly reaches the performance of the computer simulated three reduction reactor system. FIGS. 5B and 6B indicate that the addition of methane to the primary reduction reactor feed gas is an especially effective embodiment of the invention.

Figure 7A:
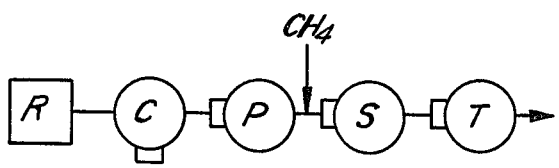
Figure 7B:
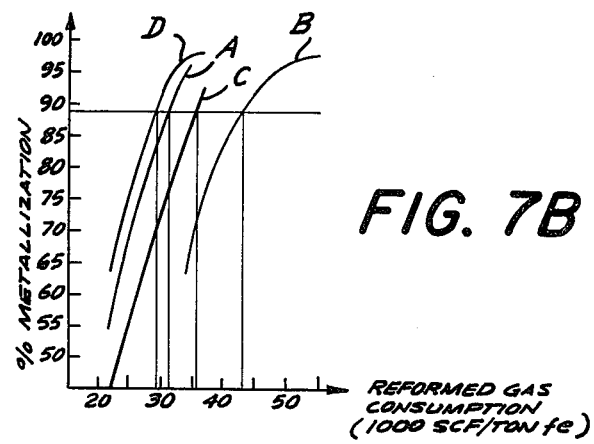

FIG. 7A illustrates a three reduction reactor system with methane being added to the feed gas to the secondary reactor. The performance of this system with 8% by volume methane added is illustrated by Curve A of FIG. 7B. A comparison of FIGS. 4B, 5B and 7B shows that the performance of this system is intermediate between that of the systems wherein the methane is fed to the primary and tertiary reactor feed gases, respectively, and that it more nearly approaches that of methane addition to the primary reactor.

Figure 8A:
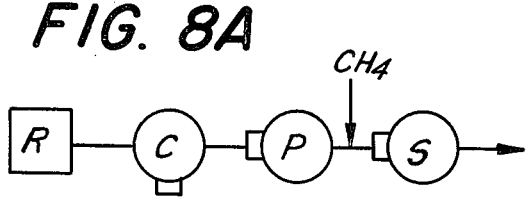
Figure 8B:
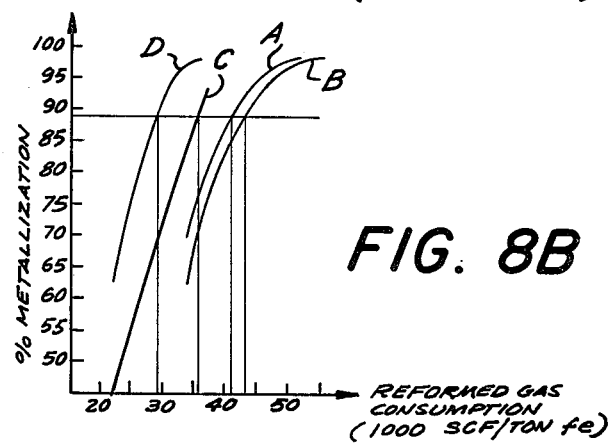

FIG. 8A illustrates a two reduction reactor system with methane added to the feed gas to the secondary reactor. The performance of this system is illustrated by Curve A of FIG. 8B. A comparison of Curves A and B of FIG. 8B shows that a significant improvement in performance is attained, although the improvement is not as great as when the methane is fed to the primary reactor as illustrated by Curve A of FIG. 6B.

Figure 9A:
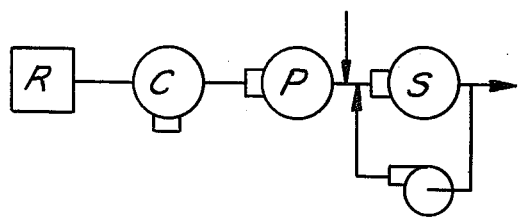
Figure 9B:
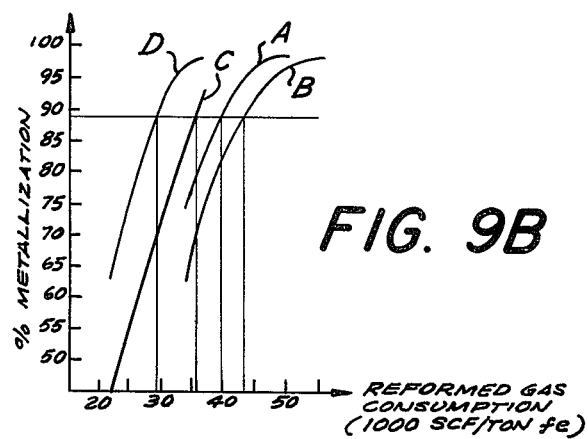

FIG. 9A illustrates a two reduction reactor system with addition of methane to the feed gas to the secondary reactor and recycle of effluent gas from the secondary reactor to the secondary reactor feed gas. Curve A of FIG. 9B illustrates the results obtained with 8% by volume of methane being added and a recycle of 16% by volume. A comparison of Curves A and B of FIG. 9B with Curves A and B of FIG. 8B shows that the recycle produces a significant additional improvement in the performance of the system.

Figure 10A:
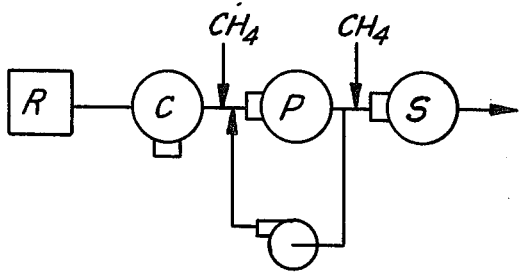
Figure 10B:
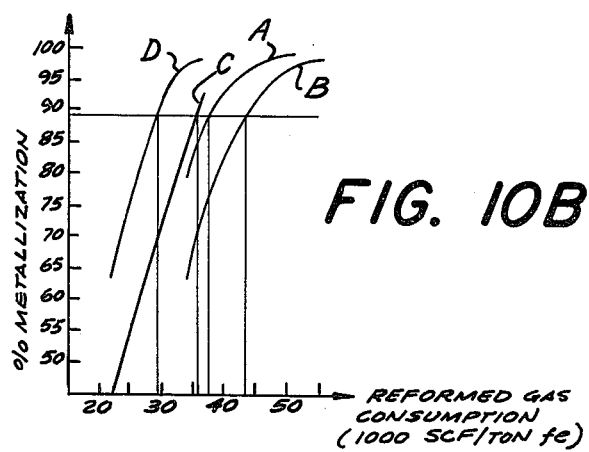

FIG. 10A illustrates a two reactor system with methane added to the feed gas to both the primary and secondary reduction reactors and recycle of effluent gas from the primary reactor back to the primary reactor inlet. Curve A of FIG. 10B illustrates the performance of this system with 4% by volume methane added to the primary reactor feed gas, and 8% by volume methane added to the secondary reactor feed gas, and 8% by volume of recycled gas. A further improvement in performance in respect to the system of FIG. 9A is indicated.

Figure 11A:
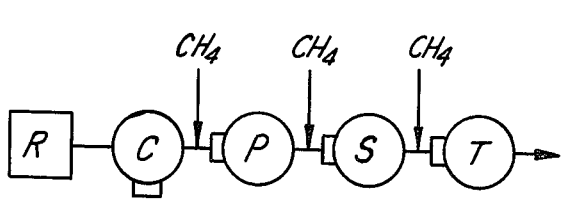
Figure 11B:
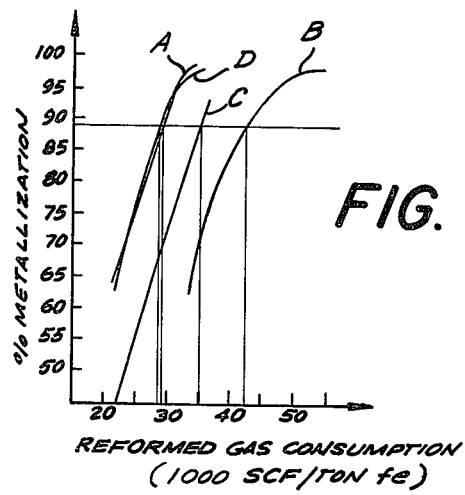

FIG. 11A illustrates a three reduction reactor system with methane added to the feed gas to each of the three reduction reactors. The performance of this system when adding 4% by volume methane to the feed gas to each of the three reduction reactors is illustrated by Curve A of FIG. 11B. It will be noted that Curve A very nearly coincides with Curve D which represents the ideal three reduction reactor performance without added methane. Thus this system is an exceptionally effective embodiment of the invention.

Figure 12A:
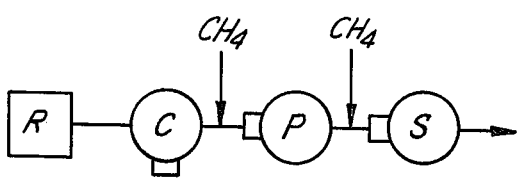
Figure 12B:
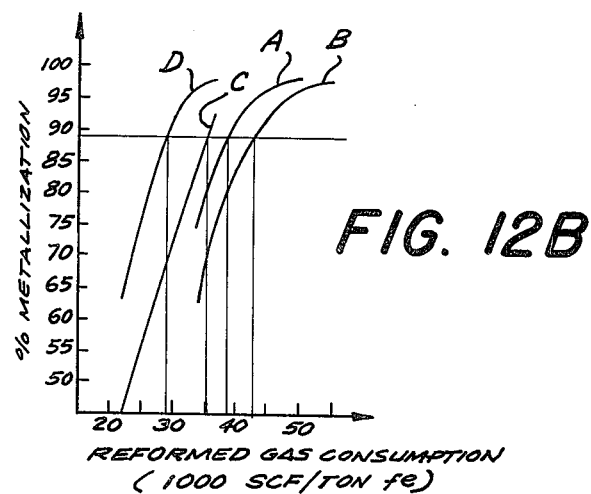

FIG. 12A represents a two-reactor counterpart of the system of FIG. 11A in that methane is added to the feed gas to each of the primary and secondary reactors. The performance of this system with 4% by volume methane added to the feed gas to each of the reduction reactors is illustrated by Curve A of FIG. 12B. A comparison of Curves A and B of FIG. 12B shows that the addition of methane produces a substantial improvement in performance in this system.

Figure 13A:
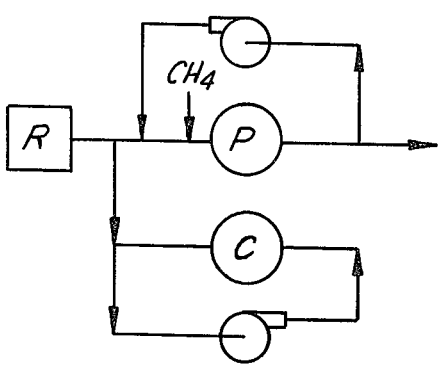
Figure 13B:
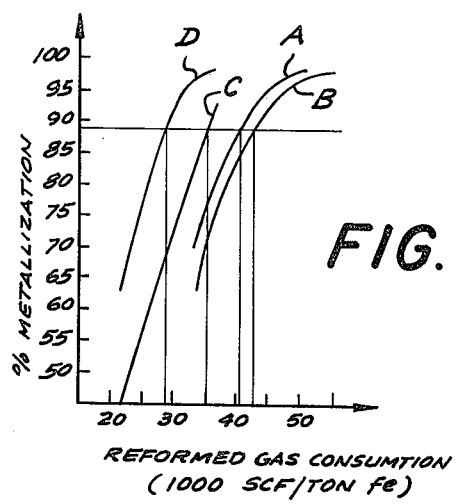

FIG. 13A illustrates a system having an out-of-line cooling reactor and only a single reduction reactor with methane added to the feed gas to the reduction reactor and recycle of effluent gas around the reduction reactor. Since only a single reduction reactor is used, a high recycle ratio is required. The performance of this system with 8% added methane and 50% by volume recycle is illustrated in Curve A. A comparison of Curves A and B of FIG. 13B shows that by using a combination of methane addition and gas recycle it is possible to achieve with a single reduction reactor a performance superior to that yielded by a two-reduction reactor system operating without added methane or gas recycle.

While all of the systems of FIGS. 4A through 12A show in-line cooling reactors, it should be understood that out-of-line cooling reactors can be used in such systems with the advantages noted above.

From the foregoing description it should be apparent that the present invention provides a method for the gaseous reduction of iron ore capable of achieving the several objectives set forth at the beginning of the present specification. By adding minor amounts of methane to the feed gas streams fed to the reduction reactors, the amount of reformed gas required to effect a given metallization of a given amount of ore can be substantially reduced. By using a combination of added methane and spent reducing gas recycle, the requirement for reformed gas can be still further reduced. This economy in the requirement for reformed reducing gas permits a decrease in the size of the reformer required to produce a given amount of sponge iron and hence decreases the initial investment required for a plant of a given production capacity. This desirable result is achieved with little, if any, increase in the operating cost of the system.

The addition of methane to the reformed gas fed to the reduction reactors is especially important in the case of a three reduction reactor system wherein channelling of the gas in the reactor and hang-ups of the reduced ore upon discharge have heretofore made utilization of a three reduction reactor system impractical. By using methane addition in accordance with the present invention such a three reduction reactor system becomes commercially practical, and thus it becomes possible to take advantage of the economies inherent in the use of such a three reduction reactor system.

As particularly shown in FIGS. 3, 9B and 10B, the improved reducing gas economy obtained by adding methane to the feed reducing gas to the reduction reactors can be still further improved by using a combination of methane addition and spent gas recycle. It is difficult to pinpoint the precise manner in which the added methane and spent gas cooperate to provide the improved reducing gas economy obtained with this embodiment of the present process because of the fact that the several gas streams interact with each other and with the ore bodies of the several reactors of the system by a considerable number of different reactions, most, if not all, of which have temperature-dependent equilibria.

While we do not wish to be bound by any particular theory as to why this combination yields the novel result described above, it is our present understanding that the improved reducing gas economy obtained by using both methane addition and spent gas recycle results from the production of additional effective reducing gas by reaction of the added methane with components of the recycled spent gas in accordance with either or both of the following equations:

$$CH_4 + CO_2 \rightarrow 2CO + 2H_2 \quad (1)$$

$$CH_4 + H_2O \rightarrow CO + 3H_2 \quad (2)$$

The recycled spent gas still contains a certain amount of carbon monoxide and hydrogen initially formed in the reformer, as well as carbon dioxide and water vapor formed as reduction reaction products in the reduction reactors of the system. By mixing minor amounts of this spent gas and a hydrocarbon gas such as methane with the cooling reactor effluent gas and heating the resulting mixture, it appears that a substantial amount of useful reducing constituents, i.e., carbon monoxide and hydrogen, can be regenerated in accordance with the foregoing equations.

It is, of course, to be understood that the foregoing description is intended to be illustrative only and that numerous changes can be made in the disclosed systems without departing from the scope of the invention as defined in the appended claims. Thus the feed streams to systems of the type disclosed may vary rather widely as to composition and source. Considering first the feed stream to the catalytic reformers of FIGS. 1 and 2, the presently preferred feed is methane or natural gas. However, other gaseous hydrocarbons or vaporized hydrocarbons can be used. Also gas mixtures containing substantial amounts of hydrocarbon, e.g., purified coke oven gas can be used.

The reducing gas used may also be derived from other sources than the catalytic reformers illustratively disclosed. Thus the reducing gas may be produced by partial oxidation of gaseous liquid or solid hydrocarbons with air, oxygen or natural oxides. Where economics permit, gases composed largely of hydrogen can be used. In the appended claims the reducing gas is charcterized as largely composed of carbon monoxide and hydrogen; this phraseology is intended to cover gas mixtures having a high proportion of hydrogen and little, if any, carbon monoxide.

The fluid hydrocarbon mixed with the reducing gas fed to the reduction reactors is desirably methane. However, as indicated above, it may also be a mixed gas containing a substantial amount of methane, such as for example, purified coke oven gas or natural gas. It will be understood that where a mixed gas is used the percentages of added gas specified relate to the methane content of the added gas and not to the entire value of added gas.

It should further be noted that if, in the system of FIG. 1, it becomes necessary to take one reactor out of service for repairs, the remaining reactors can be connected as illustrated in FIG. 2 and production can thereby be maintained while repairs are being made to the reactor that is out of service.

Other modifications will be apparent to those skilled in the art.

I claim:

1. A method for the batchwise gaseous reduction of metal oxides to metals in a multiple unit reactor system of the type in which separate fixed beds of metal-bearing material are simultaneously treated in a plurality of interchangeable reactors including a cooling reactor and at least one reduction reactor, which method comprises preparing a preformed reducing gas composed largely of carbon monoxide and hydrogen outside of the reactor system causing at least a portion of said preformed reducing gas to flow successively through the bed of metal-bearing material in said cooling reactor and then through the bed of metal-bearing material in said reduction reactor or reactors, heating said reducing gas before it is fed to each said reduction reactor or reactors, cooling and de-watering said gas after it leaves each said reduction reactor or reactors, and after said reducing gas has passed through said cooling reactor mixing a small amount of fluid hydrocarbon with the reducing gas fed to at least one reduction reactor of said system prior to the point at which said reducing gas is heated, to increase the productivity of said reduction system.

2. A method according to claim 1 wherein said system comprises a single reduction reactor and a portion of the effluent gas from said reduction reactor, after cooling and de-watering, is re-heated and recycled to said reactor.

3. A method according to claim 2 wherein from 25% to 75% by volume of the effluent gas is recycled.

4. A method for the batchwise gaseous reduction of metal oxides to metals in a multiple unit reactor system of the type in which separate fixed beds of metal-bearing material are simultaneously treated in a plurality of interchangeable reactors including a cooling reactor and a series of reduction reactors, which method comprises preparing a preformed reducing gas composed largely of carbon monoxide and hydrogen outside of the reactor system causing at least a portion of said preformed reducing gas to flow successively through the bed of metal-bearing material in said cooling reactor and then through the beds of metal-bearing material in the reduction reactors of said series, heating said reducing gas before it is fed to each reactor of said series, cooling and de-watering said gas after it leaves each reactor of said series and after said reducing gas has passed through said cooling reactor mixing a small amount of fluid hydrocarbon with the reducing gas fed to at least one of said reduction reactors prior to the point at which said reducing gas is heated, to increase the productivity of said reduction system.

5. A method according to claim 4 wherein a portion of the effluent gas from at least one of said reduction reactors, after cooling and de-watering, is reheated and recycled to said reactor.

6. A method according to claim 4 wherein a portion of the effluent gas from at least one of said reduction reactors, after cooling and de-watering, is reheated and recycled to a preceding reduction reactor of said series.

7. A method according to claim 4 wherein a small amount of fluid hydrocarbon is mixed with the reducing gas fed to each reduction reactor of said series.

8. A method for the batchwise gaseous reduction of iron oxide to sponge iron in a multiple unit reactor system of the type in which separate fixed beds of iron-bearing material are simultaneously treated in a plurality of interchangeable reactors including a cooling reactor and a series of reduction reactors, which method comprises preparing a preformed reducing gas composed largely of carbon monoxide and hydrogen by catalytic reformation of a mixture of methane and steam passing said preformed gas successively through the bed of iron-bearing material in said cooling reactor and then through the beds of iron-bearing material in the reduction reactors of said series, heating said reducing gas before it is fed to teach reactor of said series, cooling and de-watering said gas after it leaves each reactor of said series and after said reducing gas has passed through said cooling reactor mixing a small amount of gaseous hydrocarbon with the reducing gas fed to at least one of said reduction reactors prior to the point at which said reducing gas is heated, to increase the productivity of said reduction system.

9. A method according to claim 8 wherein said gaseous hydrocarbon is mixed with the reducing gas fed to the first reduction reactor of said series.

10. A method according to claim 9 wherein a portion of the effluent gas from the last reduction reactor of said series, after cooling and de-watering, is reheated and recycled to the first reduction reactor of said series.

11. A method according to claim 8 wherein said gaseous hydrocarbon is mixed with the reducing gas fed to the second reduction reactor of said series.

12. A method according to claim 11 wherein the effluent gas from the second reduction reactor of said series, after cooling and de-watering is reheated and recycled to said second reduction reactor.

13. A method according to claim 8 wherein said gaseous hydrocarbon is mixed with the reducing gas fed to the last reduction reactor of said series.

14. A method according to claim 8 wherein said gaseous hydrocarbon is mixed with the reducing gas fed to each of the first two reduction reactors of said series.

15. A method according to claim 14 wherein the effluent gas from said first reduction reactor, after cooling and de-watering, is reheated and recycled to said first reduction reactor.

16. A method for the batchwise gaseous reduction of iron oxide to sponge iron in a multiple unit reactor system of the type in which separate fixed beds of iron-bearing material are simultaneously treated in a plurality of interchangeable reactors including a cooling reactor and a series of three reduction reactors which method comprises preparing a preformed reducing gas composed largely of carbon monoxide and hydrogen by catalytic reformation of a mixture of steam and methane, passing said preformed gas successively through the bed of iron-bearing material in said cooling reactor and then through the beds of iron-bearing material in the three reduction reactors of said series, heating said reducing gas before it is fed to each of the three reduction reactors, cooling and de-watering said gas after it leaves each of the three reduction reactors and mixing with the reducing gas fed to at least the first of said three reduction reactors, after it has passed through said cooling reactor and prior to the point at which it is heated, from 2% to 12% by volume of a gaseous hydrocarbon based on the volume of said reducing gas.

17. A method according to claim 16 wherein gaseous hydrocarbon is added to the reducing gas fed to each of the three reduction reactors.

18. A method according to claim 16 wherein a portion of the effluent gas from at least one reduction reactor, after cooling and de-watering, is mixed with the reducing gas fed to one of said reduction reactors, the volume of recycled effluent gas being from 3% to 30% of the volume of said reducing gas.

19. A method according to claim 4 wherein the fluid hydrocarbon is methane.

20. A method according to claim 4 wherein the fluid hydrocarbon is natural gas.

21. A method according to claim 4 and wherein a portion of the preformed gas from said source flows to said cooling reactor and the remainder of the preformed gas from said source flows to the first reduction reactor of said series through a by-pass around said cooling reactor to reduce the pressure drop between said source and said first reduction reactor.

22. A method according to claim 6 and wherein a portion of the preformed gas from said source flows to said cooling reactor and the remainder of the preformed gas from said source flows to the first reduction reactor of said series through a by-pass around said cooling reactor to reduce the pressure drop between said source and said first reduction reactor.

23. A method according to claim 4 wherein the fluid hydrocarbon is purified coke oven gas.

24. A method for the batchwise gaseous reduction of iron oxide to sponge iron in a multiple unit reactor system of the type in which separate fixed beds of iron-bearing material are simultaneously treated in a plurality of interchangeable reactors including a cooling reactor and a series of reduction reactors, which method comprises preparing a preformed reducing gas composed largely of carbon monoxide and hydrogen outside said reactor system, causing at least a portion of said preformed gas to flow successively through the bed of iron-bearing material in said cooling reactor and then through the beds of iron-bearing material in the reduction reactors of said series, heating said reducing gas before it is fed to each reactor of said series, cooling and de-watering said gas after it leaves each reactor of said series and after said reducing gas has passed through said cooling reactor mixing a small amount of fluid hydrocarbon with the reducing gas fed to at least one of said reduction reactors prior to the point at which said reducing gas is heated, to increase the productivity of said reduction system.

25. A method for the batchwise gaseous reduction of iron oxide to sponge iron in a multiple unit reactor system of the type in which separate fixed beds of iron-bearing material are simultaneously treated in a plurality of interchangeable reactors including a cooling reactor and a series of three reduction reactors, which method comprises preparing a preformed reducing gas composed largely of carbon monoxide and hydrogen by catalytic reformation of a mixture of steam and fluid hydrocarbon, causing at least a portion of said preformed gas to flow successively through the fixed bed of iron-bearing material in said cooling reactor and then through the fixed beds of iron-bearing material in the three reduction reactors of said series, heating said reducing gas before it is fed to each of the three reduction reactors, cooling and de-watering said gas after it leaves each of the three-reduction reactors and mixing with the reducing gas fed to at least the first of said three reduction reactors, after it has passed through said cooling reactor and prior to the point at which it is heated, from 2% to 12% by volume of a fluid hydrocarbon based on the volume of said reducing gas.

26. A method according to claim 24 and wherein the heated reducing gas fed to said one reduction reactor is mixed, prior to its entry into said one reactor, with an oxygen-containing gas to cause at least a portion of the hydrocarbon content thereof to be converted to carbon monoxide and hydrogen.

27. A method according to claim 16 and wherein the heated reducing gas fed to said first reduction reactor is mixed, prior to its entry into said first reactor, with an oxygen-containing gas to cause at least a portion of the methane content thereof to be converted to carbon monoxide and hydrogen.

* * * * *